Dec. 1, 1925. 1,564,150

A. R. THOMPSON

PRESSURE COOKER

Original Filed July 18, 1922    2 Sheets-Sheet 1

Inventor
Albert R. Thompson
By Alexander Fowell
Attorneys

Dec. 1, 1925.
A. R. THOMPSON
PRESSURE COOKER
Original Filed July 18, 1922    2 Sheets-Sheet 2
1,564,150
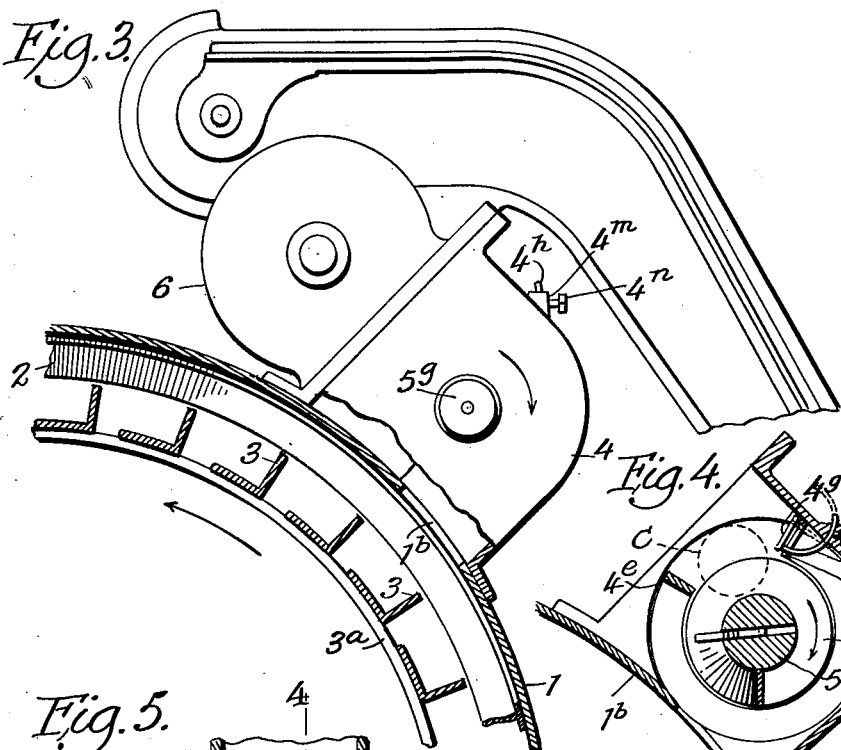
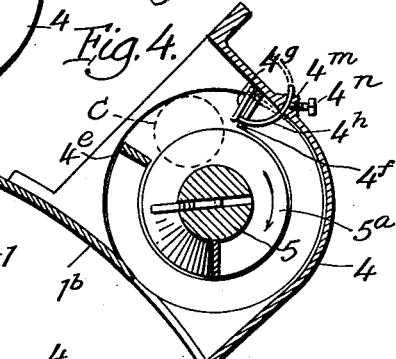
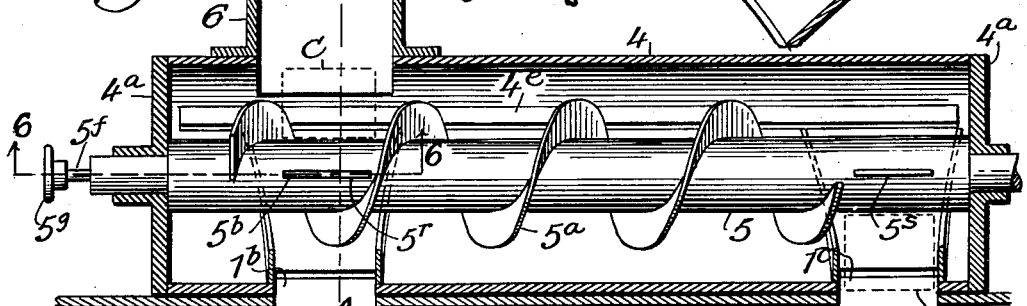
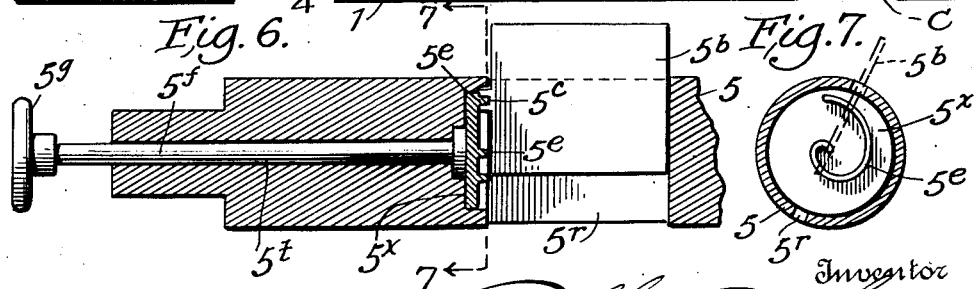
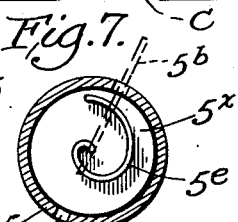

Patented Dec. 1, 1925.

1,564,150

UNITED STATES PATENT OFFICE.

ALBERT R. THOMPSON, OF SAN JOSE, CALIFORNIA, ASSIGNOR TO ANDERSON-BARN-GROVER MFG. CO., OF SAN JOSE, CALIFORNIA, A CORPORATION OF CALIFORNIA.

PRESSURE COOKER.

Application filed July 18, 1922, Serial No. 575,879. Renewed April 3, 1925.

*To all whom it may concern:*

Be it known that I, ALBERT R. THOMPSON, a citizen of the United States, residing at San Jose, in the county of Santa Clara and State of California, have invented certain new and useful Improvements in Pressure Cookers; and I hereby declare that the following is a full, clear, and exact description thereof, reference being had to the accompanying drawings, which form part of this specification.

This invention is an improvement in so-called pressure cookers, wherein sealed containers, such as cans containing foods or other material to be "cooked" are subjected to a temperature above 212° F. for a period of time sufficient to properly "cook" the contents of the container. Owing to the high temperature employed it is necessary to maintain such an external pressure around the containers during the cooking operation that the pressure of the steam or vapor generated in the interiors of the containers during the cooking operation will not burst the containers or open the seams thereof; and such external pressure should be maintained during the cooling of the containers until the temperature and pressure of the contents thereof have been sufficiently reduced to obviate any danger of explosion or opening of the seams of the containers when the latter are removed from the cooker or cooler.

The invention has particular reference to that type of so-called continuous pressure cookers in which the containers are successively fed into the "cooking" chamber and moved therethrough during the "cooking" operation, while retained in the chamber long enough to insure the proper cooking or processing of the contents of the containers, and are then successively discharged therefrom at the same speed at which they are fed thereto. This enables the cooking operation to be performed continuously and uninterruptedly, while the containers are subjected to heat in the cooking chamber long enough to effect the desired treatment of the contents thereof.

Heretofore in order to enable continuous pressure cookers to treat containers whose contents require different periods of time for cooking, it has been necessary to change the speed at which such containers are caused to traverse the heated zone; so that containers whose contents require a long treatment will be moved slowly, and containers whose contents require a shorter treatment will be moved faster through the cooking zone. It is therefore one object of the invention to permit containers where contents require different lengths of treatment to be cooked in one apparatus without having to materially change the speed of travel of the containers therethrough.

Heretofore cookers have been provided with means for feeding the containers into the cooking zone at different points, by a plurality of feeding devices, and with means for discharging the containers from the cooking zone at different points, through a plurality of discharge devices. Where pressure cookers are used, it is necessary that both the feed devices and discharge devices should be approximately steam tight and water tight, so as not to waste the heat. It is another object of my invention to enable containers to be fed to the cooking zone of a pressure cooker through one feed valve and then entered at any one of a plurality of different points into the cooker canway, so that the containers can be made to traverse more or less of the length of the canway according to the length of heat treatment required by the contents of the containers, thus only requiring one feed valve; and enabling the containers to be discharged from the pressure cooking zone at one point. Thus in my invention only one feed valve and one discharge valve are required while obtaining various lengths of travel of the cans through the pressure cooker.

My invention provides a pressure cooker preferably having a spiral canway, means for impelling the containers along said canway, a single feed valve, a single discharge valve, and means whereby the containers may be caused to traverse more or less of the length of the canway after they have been introduced into the cooker through the feed valve and before they reach the discharge valve.

In the accompanying drawings I have illustrated one practical form of the apparatus and will explain the invention with reference thereto, to enable others to adapt and use the invention; and the claims, following the description, summarize the essentials of the invention, and novel features of construction, and novel combinations of parts for which protection is desired.

In said drawings:

Fig. 3 is an enlarged detail transverse section on the line 3—3 Fig. 1.

Fig. 4 is a transverse section on the line 4—4 Fig. 5.

Fig. 5 is an enlarged longitudinal section through the conveyor shelf.

Fig. 6 is an enlarged sectional view on the line 6—6 Fig. 5.

Fig. 7 is a transverse section on the line 7—7 Fig. 6.

Figure 1:
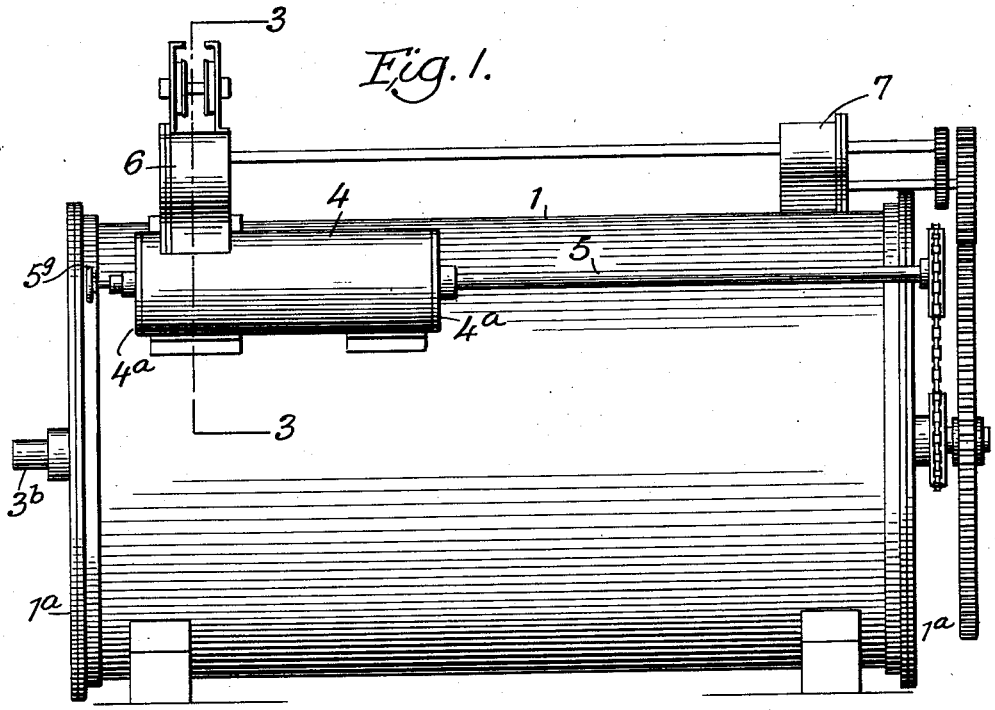
Fig. 1 is a side elevation of a pressure cooker equipped with my invention.
Figure 2:
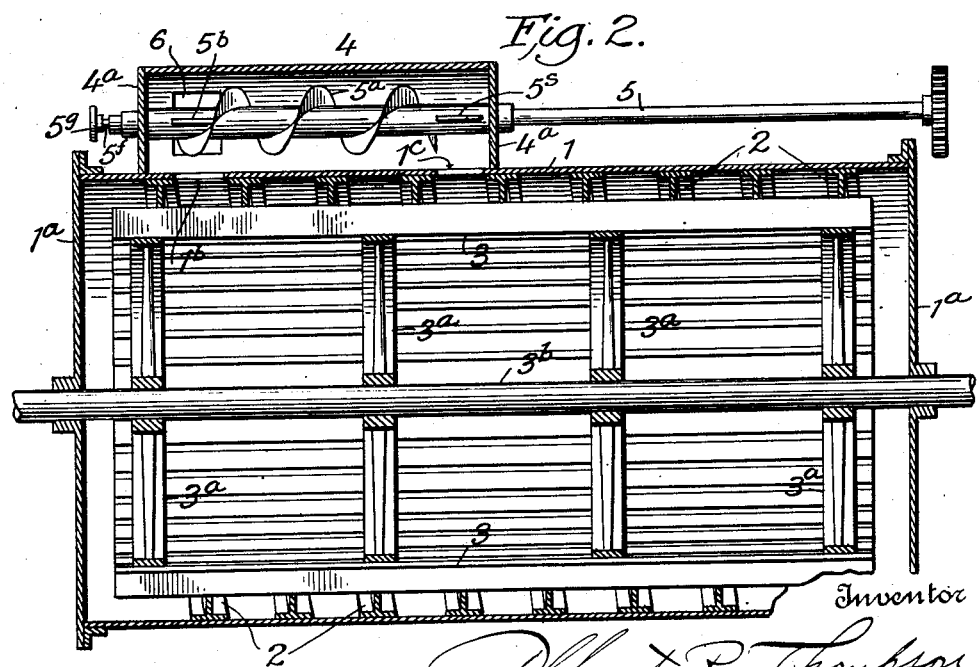
Fig. 2 is a conventional longitudinal section therethrough.

The cooking chamber may be of any desired construction. Preferably it comprises a cylindric shell 1 closed at its ends by heads 1ª. Within this shell 1 is a spiral canway preferably formed of T-iron 2 attached to the inner wall of the shell 1 and extending in a continuous spiral from the inlet at one end thereof to the outlet at the other end thereof. Cooperating with, and arranged within this spiral canway, is a reel or drum preferably composed of longitudinally disposed parallel iron L-bars 3, attached to spiders 3ª mounted on a shaft 3ᵇ, suitably journaled in bearings in the heads 1ª as shown. The L-bars 3 are so spaced that they may receive containers C (indicated in dotted lines in Figs. 4 and 5) between them and hold the containers in the spiral canway. The rotation of the reel causes the containers to travel around the spiral canway, and the rail 2 causes the containers to move lengthwise of the reel, from the point of their entry into the canway, to the point of their discharge therefrom.

The general construction of this canway is preferably as shown in my Reissue Patent #15,334, dated April 11, 1922.

In the upper side, and near one end of the cooker, a plurality of inlet ports are formed, each communicating directly with the canway, so that containers passed through said ports would enter the canway at different points. In the drawings, only two ports 1ᵇ, 1ᶜ are shown.

Mounted on the shell 1 at the feed end thereof, is an approximately cylindric housing 4, which may be of any desired length, and in the example shown, extends between and over both ports 1ᵇ, 1ᶜ in shell 1. This housing 4 is closed by end plates 4ª, and may be fastened to the shell 1 in any suitable manner so that while there is free communication between the interior of the shell and the housing 4 (through ports 1ᵇ, 1ᶜ) escape of steam is prevented.

Extending through the housing 4 is a shaft 5 which carries a spiral conveyor blade 5ª which is of less diameter than the diameter of the housing 4, and extends from port 1ᵇ to port 1ᶜ.

Arranged longitudinally of and within the housing at opposite sides of the conveyor blade 5ª are bars 4ᵉ and 4ᶠ (see Fig. 4), which together with the upper side of shaft 5, form a trough in which the containers C may be supported and guided in the chamber 4.

Connected with the housing 4 directly adjacent port 1ᵇ is a feed valve 6 which is preferably constructed and operated as described in my aforesaid Reissue Patent #15,334, but may be of any other suitable construction. Valve 6 is adapted to receive the containers C one at a time and deliver them successively into the housing 4. The containers may be fed to this feed valve 6, as described in my aforesaid reissue patent.

The containers fed by the valve 6 into the housing 4, drop upon the shaft 5 between the bars 4ᵉ, 4ᶠ, and would ordinarily be impelled lengthwise of the housing 4 by the spiral conveyor blade 5ª.

If desired, the containers may be discharged from housing 4 directly into the canway, through the port 1ᵇ. For this purpose, as shown, the shaft 5 may be provided at a point directly opposite feed valve 6, with a diametrical slot 5ˢ in which is guided a radially movable ejector blade 5ᵇ which may be retracted into the slot 5ˢ if it is not desired to direct the containers into port 1ᵇ; or the blade may be projected as in Figs. 4 and 6 when it is desired to discharge the containers from the valve 6 directly into the canway through the port 1ᵇ.

The blade 5ᵇ may be adjusted in various ways. As shown it is provided at one end with teeth 5ᶜ adapted to engage a spiral flange or tooth 5ᵉ on a disk 5ˣ attached to a rod 5ᶠ extending through a bore 5ᵗ in the adjacent end of shaft 5; said rod 5ᶠ being provided with a hand piece 5ᵍ on its outer end by which the rod 5ᶠ and disk 5ˣ may be rotated. By turning the hand piece 5ᵍ, and disk 5ˣ the blade 5ᵇ may either be projected from the shaft 5, as shown in Figs. 4 and 6, or may be retracted therein according to the direction of rotation of the hand piece 5ᵍ. The pitch of the spiral tooth 5ᵉ on disk 5ˣ is preferably such that one complete revolution of said disk 5ˣ will move the ejector blade 5ᵇ from its innermost to its outermost position. The spiral tooth connection between the ejector blade 5ᵇ and the disk 5ˣ will positively lock the blade 5ᵇ in any adjusted position, thereby insuring that the blade will remain as adjusted, during rotation of the shaft 5.

When projected, the blade 5ᵇ will engage a container C just after it is fed from the feed valve 6 into the housing 4, and push such container around and out of the housing 4 into the port 1ᵇ.

To permit this, the bar 4ᶠ is provided with a hinged section or gate 4ᵍ at a point adjacent the valve 6, and port 1ᵇ, so that when the containers are to be moved out of the canway as shown in Fig. 4, the ejector blade 5ᵇ can push the containers through this gate around in housing 4, under the shaft 5 and eject them through the port 1ᵇ into the first spiral or run of the canway, in the cooker.

The hinged section or gate 4ᵍ is preferably provided with a quadrant 4ʰ (as shown in Fig. 4) attached to the gate 4ᵍ in any desired manner, and extending up through a slot in a lug 4ᵐ on the outer face of the casing 4. A set screw 4ⁿ tapped into the lug is adapted to engage the quadrant 4ʰ and securely hold the gate 4ᵍ either in open or closed position, as desired.

When containers are entered through the port 1ᵇ they traverse the entire length of the canway, and will be subjected to the full cooking period. If desired to cook the containers for a shorter time, the gate 4ᵍ should be closed, and the blade 5ᵇ retracted within the shaft 5. Then the containers fed by the valve 6 will rest on the shaft 5 between bars 4ᵉ, 4ᶠ, and will be caused to travel lengthwise of said shaft by the spiral conveyor blade 5ᵃ until they come opposite the port 1ᶜ, where they will be engaged by a stationary ejector blade 5ˢ on shaft 5, (which corresponds in function to the blade 5ᵇ, when the latter is projected), whereby the containers C will be directed past the end, or through an opening in the bar 4ᶠ, around and below the shaft 5, and the port 1ᶜ into the adjacent spiral run of the canway. Notice port 1ᶜ is much nearer the discharge valve than the port 1ᵇ; the containers admitted into the cooker through port 1ᶜ (while moving through the cooker at the same rate of speed as the containers admitted through the port 1ᵇ) will reach the outlet valve in a much shorter time and consequently be subjected to the cooking temperature for a less period of time.

The containers are preferably discharged from the cooking chamber by any suitable means; but I preferably use a discharge valve 7, and an ejector wheel 7ᵇ constructed and arranged to operate as shown and described in my aforesaid reissue patent, and which therefore needs no further detailed description herein.

It is obvious that the containers might be moved in the housing 4 by any suitable means from the feed valve 6 to any desired inlet port, the means shown being simple and practical, but other means may be easily substituted therefor within the scope of this invention.

I have shown but two inlet ports 1ᵇ and 1ᶜ in connection with the feeding mechanism, but it will be obvious that additional inlet ports could be made in the casing and covered by the housing 4, so that containers could be admitted to still other runs of the canway, if desired, and thus caused to travel other distances in the canway, and therefore be subjected to heat for other periods of time.

In the practical construction of the apparatus the feed valve 6, the spiral conveyor blade 5, the cooker reel, and the discharge valve 7, are all operated in exact synchronism, so that each container fed into the housing 4 will be discharged therefrom through any desired inlet port into the spiral runway in the casing in exact time to register with one of the spaces between adjacent bars on the reel, and so that after the canway is filled with containers between such inlet port and the point of discharge every time a container is fed into the cooker another will be discharged therefrom, thereby enabling the apparatus to be operated continuously.

The conveyor in the housing 4, is so operated that if the containers are not to be fed into the port 1ᵇ, they will be moved through the housing from the feed valve 6 in proper time to be fed through the port 1ᶜ (or other intermediate port) so as to register with the movement of the reel bars past such port. Thus there will be no possibility of choking or jamming of containers in the cooker, because of failure of the feeding and delivery mechanisms to properly register and synchronize with the movement of the reel.

The mechanisms for operating the valves and reel may be of any suitable construction. Preferably such as described in my aforesaid reissue patent, and therefore it is not necessary to describe or illustrate same in detail herein.

It will be seen from the foregoing that I provide means whereby the containers may be fed through a single steam-tight valve into a housing from which they may be discharged into the spiral canway at different points as desired, to vary the length of travel of the containers in the cooker. All containers move through the canway at the same rate of travel, and all the containers are discharged from the canway at the same point. The advantages of having but one feed valve and one outlet valve are obvious; the principal advantages being that this does not necessitate any shifting of the feeding mechanism as all containers may be fed to the housing at the same point; no shifting of the feed valve is required, although the containers may be introduced into the canway at any one of a plurality of points. It also enables the water level to be kept very high in the cooker, assuming that super-heated water is employed as the heating element in the cooker. It further enables the pressure to be more readily maintained in the cooking zone as there is always bound to be some slight leakage through the pockets of the valves as the machine is operated, no matter how tight the valves may be packed, or how accurately they may be fitted.

It will be understood that in this apparatus the cooking chamber or tank is to be heated to a temperature exceeding 212° F., by any suitable means. I preferably use water super-heated by steam, and maintain pressure in the cooker sufficiently above atmospheric to prevent the pressure of the steam or gases generated in the containers during the cooking of their contents bursting the containers or opening the seams thereof; preferably I keep the tank filled with hot water up to about the level of the inlet ports and maintain a sufficient pressure of steam, air or gas above the water and in the housing 4 to prevent injury to the containers. Preferably also in connection with this apparatus I would employ a pressure cooler into which the containers are discharged through the valve 7, but such pressure cooler forms no part of the present invention.

What I claim is:

1. A pressure cooking apparatus, comprising a cooking chamber in which pressure may be maintained above atmospheric and having a plurality of inlet ports, a tight housing covering the said ports, means in the housing whereby containers fed into the housing may be directed through any selected inlet port into the cooking chamber; and means in the cooking chamber for moving the containers therethrough from the point of entry thereinto to the point of discharge.

2. In a cooker as set forth in claim 1, a spiral conveyor in the housing, means coacting with the conveyor whereby the containers may be discharged therefrom into any desired inlet port.

3. In a pressure cooker as set forth in claim 1, a shaft extending through the housing, a spiral conveyor on said shaft for moving the containers longitudinally of the housing, and means cooperating with the conveyor whereby the containers may be discharged therefrom into any desired inlet port.

4. A pressure cooking apparatus comprising a cooking chamber in which pressure may be maintained above atmospheric and having a plurality of inlet ports, a single discharge valve, a tight housing covering the said inlet ports, a feed valve communicating with the housing, means in the housing whereby containers fed into the housing by said valve may be directed through any selected inlet port into the cooking chamber; and means in the cooking chamber for moving the containers therethrough from the point of entry thereinto to the point of discharge.

5. In a cooker as set forth in claim 4, a spiral conveyor in the housing, and means whereby the containers may be discharged from the conveyor into any desired inlet port.

6. In a pressure cooker as set forth in claim 4, a shaft extending through the housing, a spiral conveyor on said shaft for moving the containers longitudinally of the housing, and means cooperating with the conveyor whereby the containers may be discharged therefrom into any desired inlet port.

7. A pressure cooking apparatus comprising a cooking chamber, a spiral canway therein, means for moving containers through said canway, a discharge valve at one end of the canway, a plurality of inlet ports communicating with the canway at different points, a tight housing communicating with the inlet ports, a feed valve connected with the housing and means in the housing whereby the containers may be directed through any selected inlet port into the canway.

8. In a pressure cooker as set forth in claim 7, a shaft extending through the housing, a spiral conveyor on said shaft for moving the containers longitudinally of the housing, and means whereby the containers may be discharged from the conveyor into any desired inlet port.

9. A pressure cooking apparatus comprising a cooking chamber, a spiral canway therein, a rotatable reel arranged within the canway adapted to impel containers therethrough, a discharge valve connected with one end of the canway, a plurality of inlet ports connected with different runs of the canway, a tight housing communicating with said inlet ports and communicating therewith, a feed valve communicating with the housing, and means in the housing for directing the cans into any desired one of the inlet ports, substantially as described.

10. In a cooker as set forth in claim 9, a spiral conveyor in the housing, and means coacting with the conveyor whereby the containers may be discharged therefrom into any desired inlet port.

11. In a pressure cooker as set forth in claim 9, a shaft extending through the housing, a spiral conveyor on said shaft for moving the containers longitudinally of the housing, and guides cooperating with the conveyor whereby the containers may be discharged therefrom into any desired inlet port.

12. In combination with a cooker having a plurality of inlet ports, a housing communicating with such ports, a shaft in said housing, a spiral conveyor connected with said shaft for moving containers longitudinally of the housing, an inlet for admitting containers into the housing, and means connected with the shaft whereby the containers may be discharged from the housing into any desired inlet port of the cooker.

13. In mechanism as set forth in claim 12, a gate opposite the housing inlet, and means for adjusting the gate so containers can be moved therethrough, substantially as described.

14. In mechanism as set forth in claim 12, said shaft having a radial slot, a radially movable blade in said slot, and means for moving the blade into or out of the slot.

15. In combination with a cooker having a plurality of inlet ports; a housing communicating with such ports, a shaft in said housing, a spiral conveyor connected with said shaft for moving cans longitudinally of the housing, a valve for feeding containers into one end of the housing, bars arranged at opposite sides of the conveyor to assist in guiding the containers, and means connected with the shaft whereby containers may be discharged from the conveyor into any desired inlet of the cooker.

16. In mechanism as set forth in claim 15, a gate in the guide bars opposite the port, and means for adjusting the gate so the containers can be moved therethrough, substantially as described.

17. In mechanism as set forth in claim 15, said shaft having a radial slot, a radially movable blade in said slot, and means for moving the blade into or out of the slot.

18. In combination a housing, a shaft in said housing, a spiral conveyor connected with said shaft, said shaft having a radial slot, a blade in said slot, and means for moving the blade into or out of the slot.

19. In combination a housing, a shaft in said housing, a spiral conveyor connected with said shaft, bars arranged at opposite sides of the conveyor to assist in guiding the containers, an adjustable ejector, and a gate in guide bars opposite the ejector and means for adjusting the gate so containers can be moved therethrough, substantially as described.

20. In combination a housing, a shaft in said housing, a spiral conveyor connected with said shaft, bars arranged at opposite sides of the conveyor to assist in guiding the containers, said shaft having a radial slot, a radially movable blade in said slot, and means for moving the blade into or out of the slot.

21. In mechanism as set forth in claim 20, a gate in a guide bar adjacent the blade, and means for adjusting the gate so the containers can be moved therethrough, substantially as described.

In testimony that I claim the foregoing as my own, I affix my signature.

ALBERT R. THOMPSON.